June 8, 1926.

A. V. A. FITZ 1,588,018

CLAY CUTTING APPARATUS

Filed May 27, 1925

INVENTOR

June 8, 1926.

A. V. A. FITZ 1,588,018

CLAY CUTTING APPARATUS

Filed May 27, 1925   10 Sheets-Sheet 2

Fig. 2.

INVENTOR
Arthur V. A. Fitz
by his attys.
Byrnes, Stebbins &
Parmelee

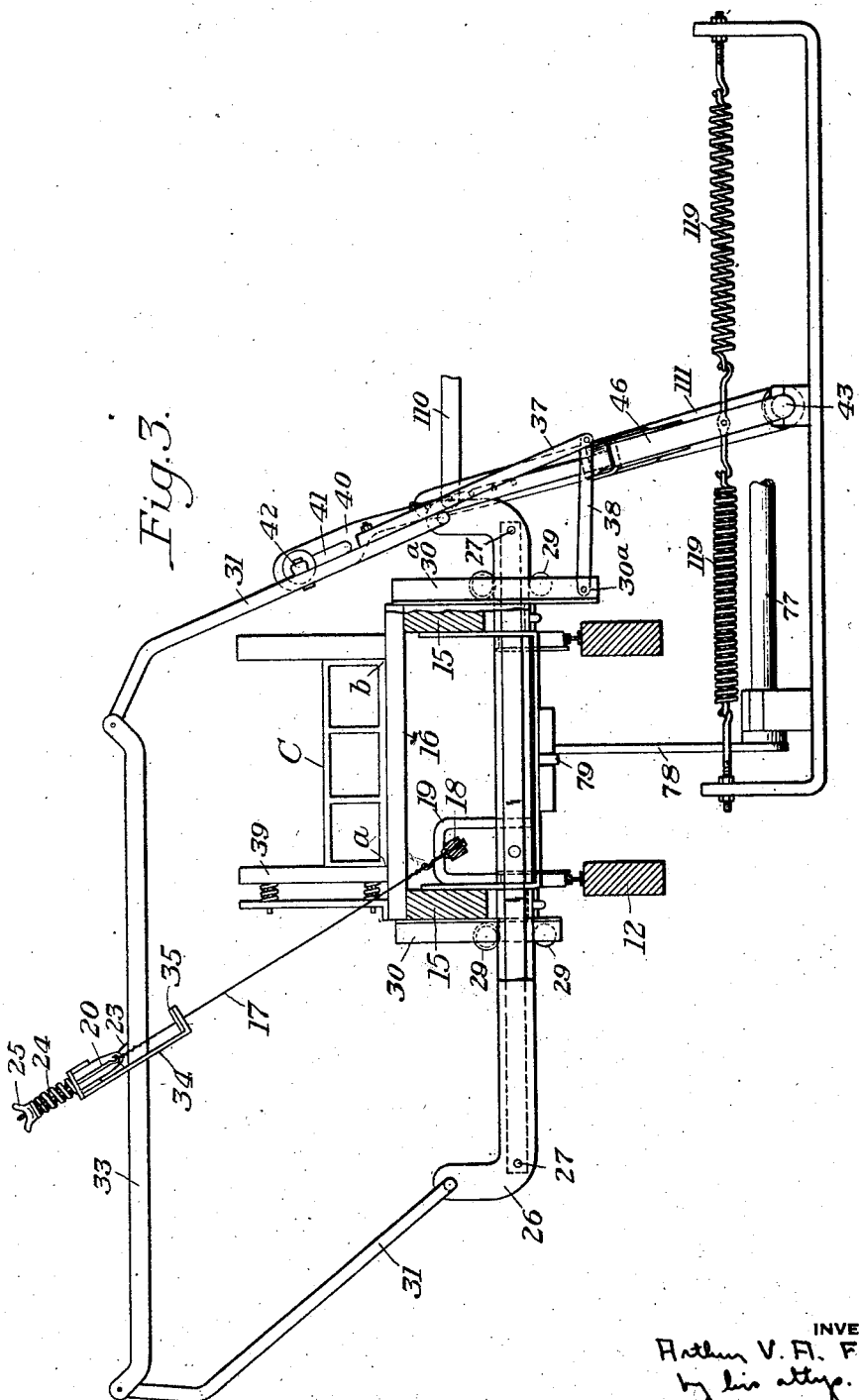

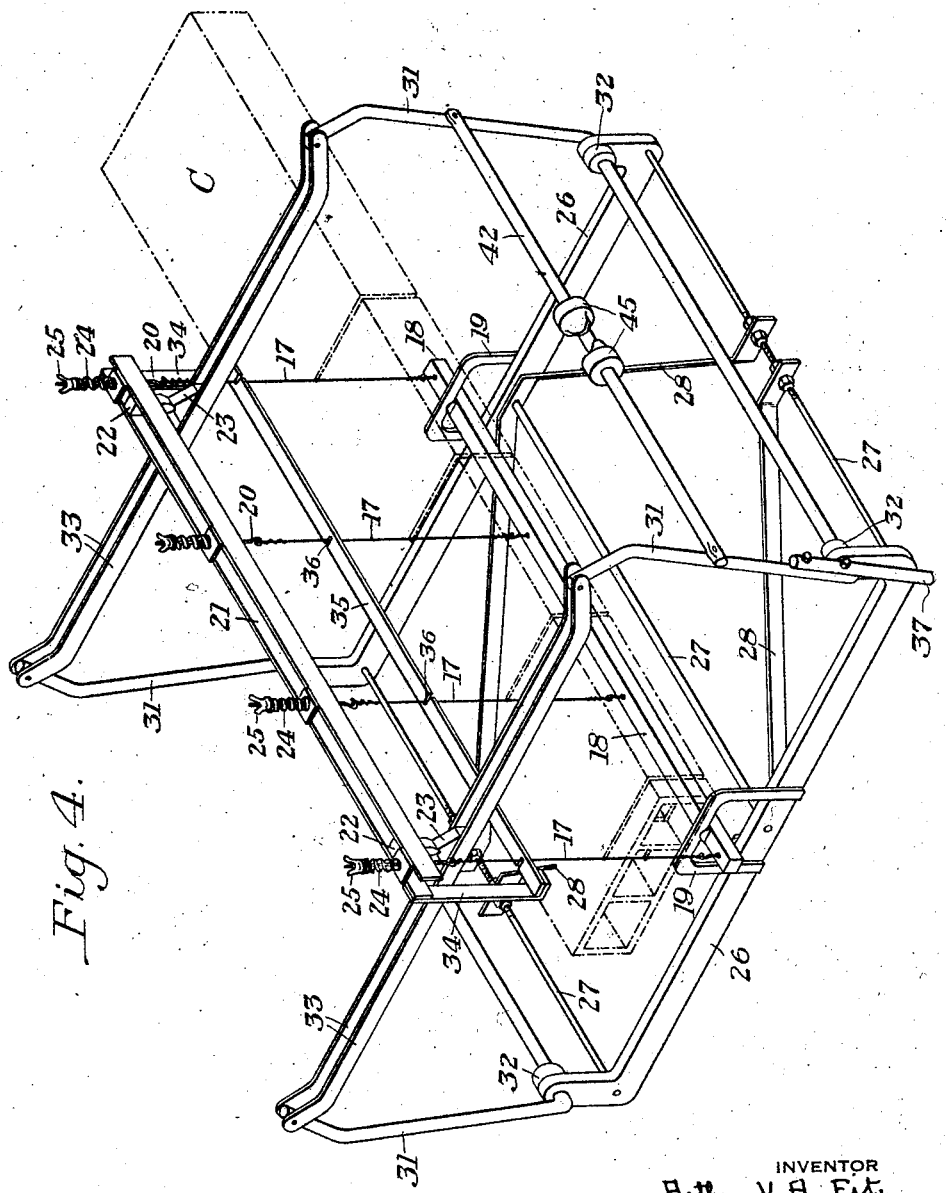

June 8, 1926.
A. V. A. FITZ
1,588,018
CLAY CUTTING APPARATUS
Filed May 27, 1925
10 Sheets-Sheet 5
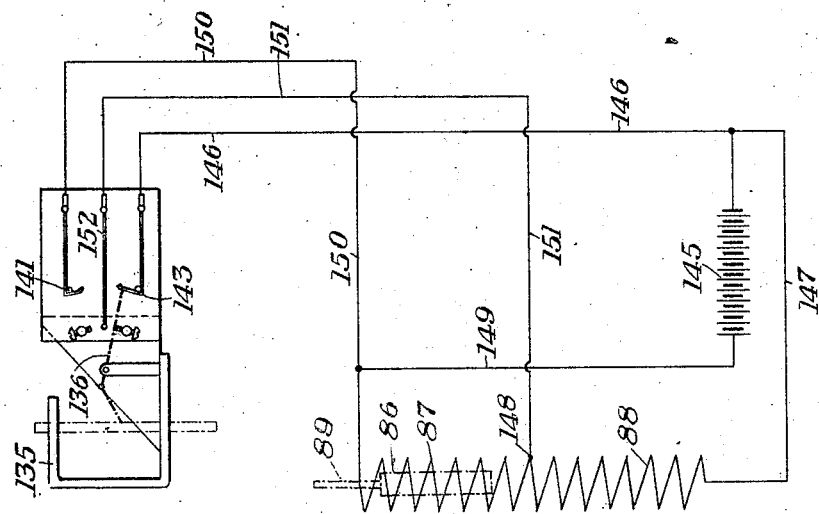
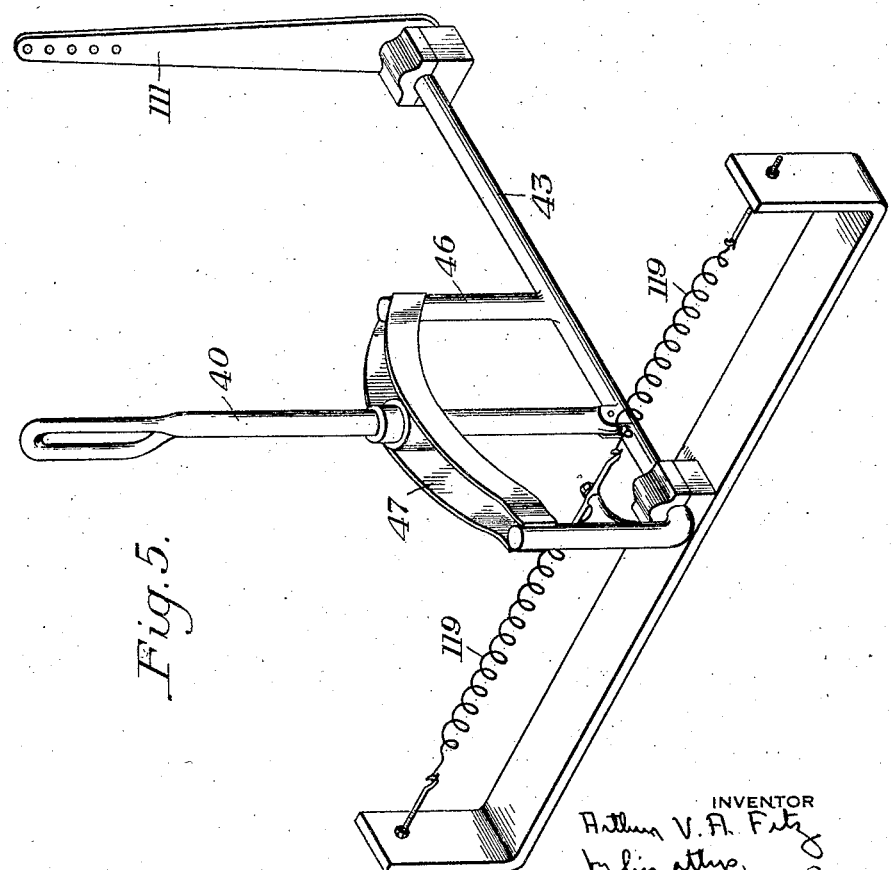

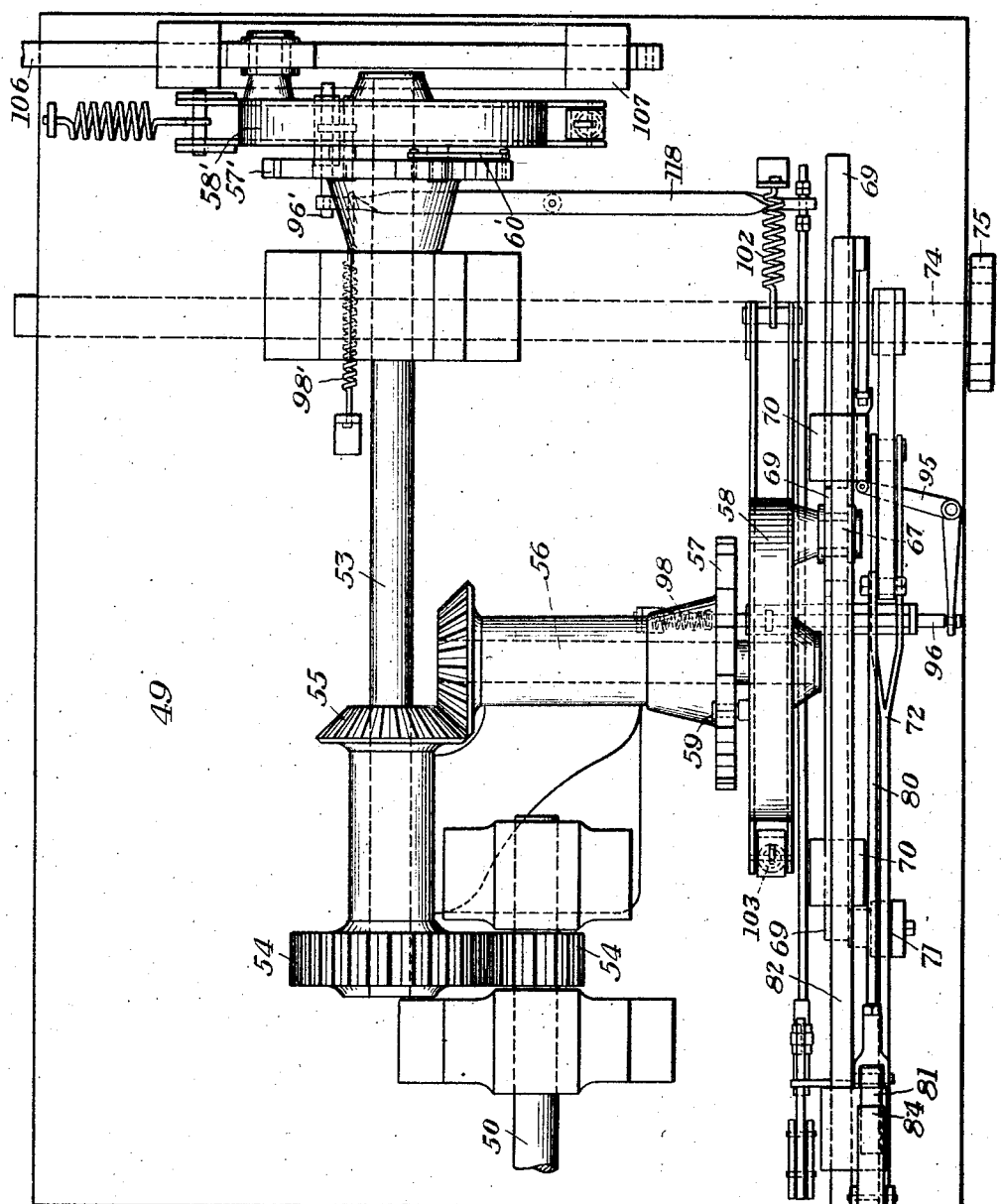

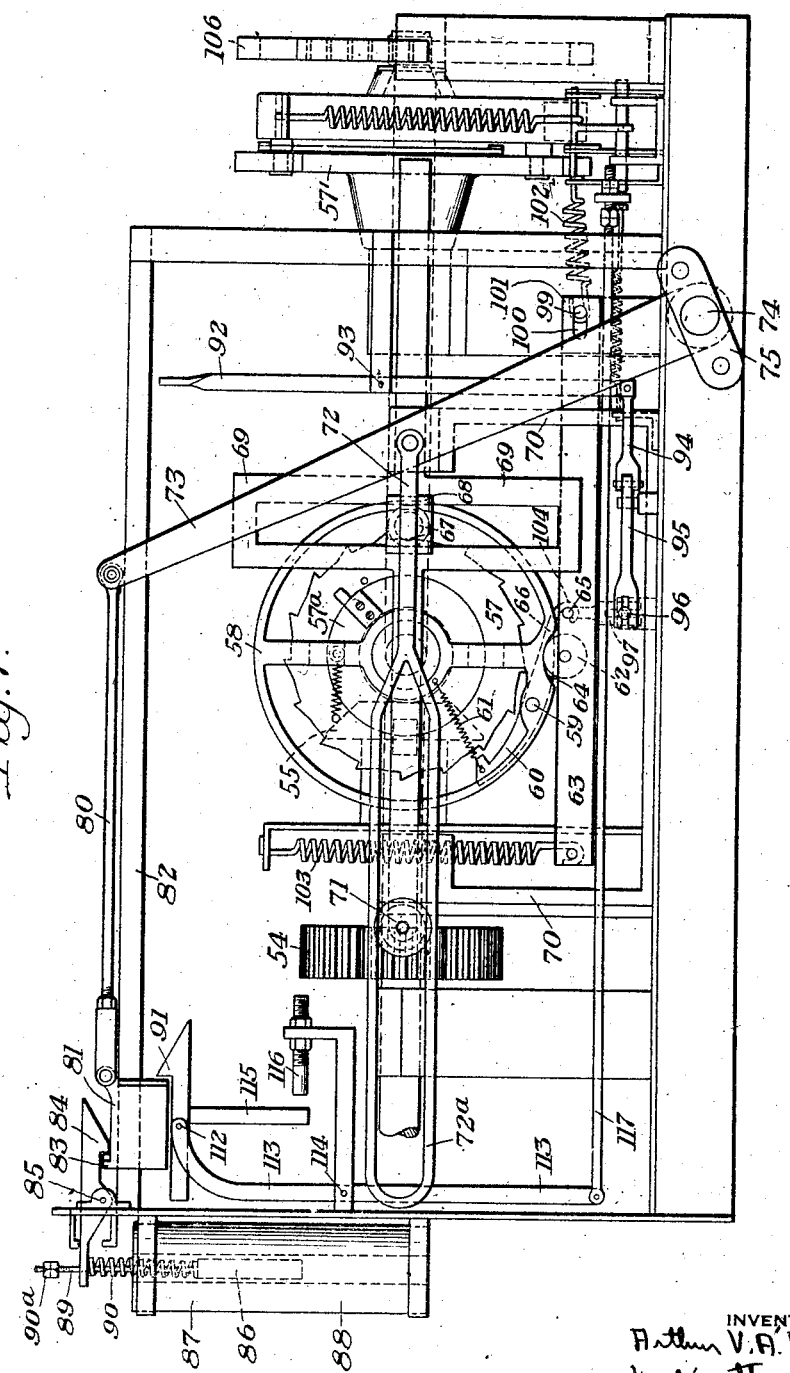

June 8, 1926.

A. V. A. FITZ 1,588,018

CLAY CUTTING APPARATUS

Filed May 27, 1925     10 Sheets-Sheet 8

INVENTOR

June 8, 1926.  
A. V. A. FITZ  
1,588,018
CLAY CUTTING APPARATUS
Filed May 27, 1925   10 Sheets-Sheet 9
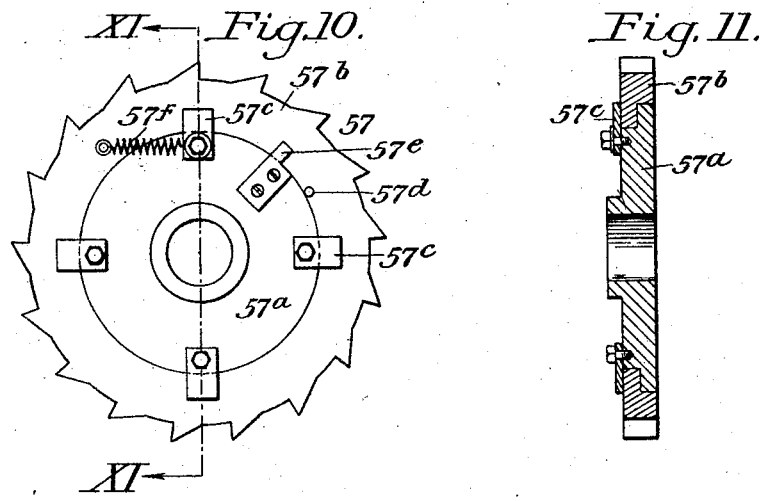
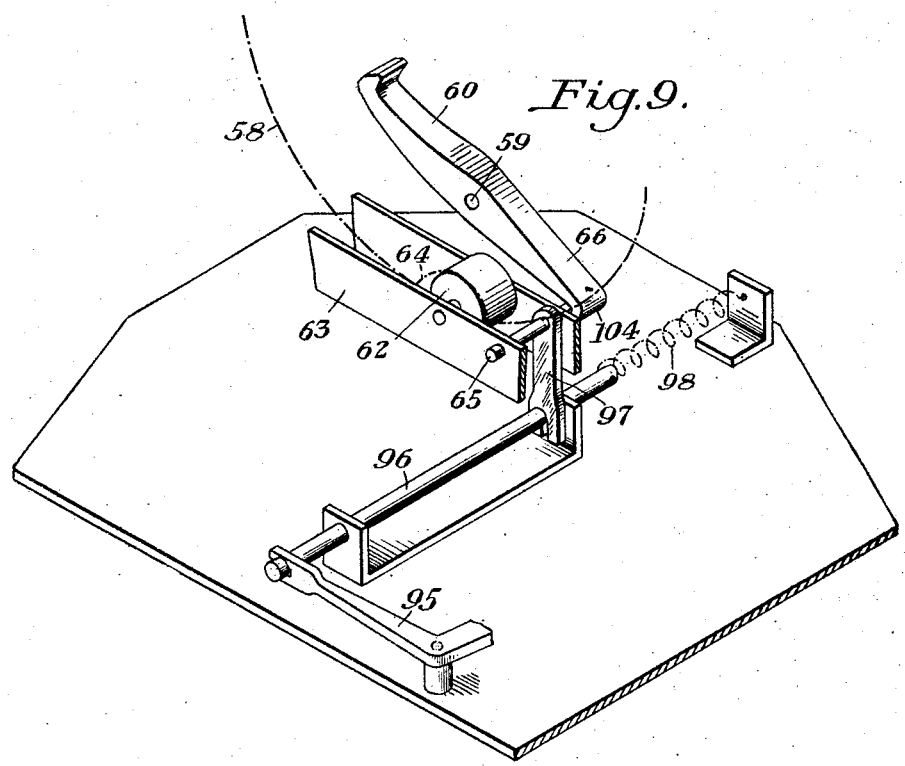
INVENTOR  
Arthur V. A. Fitz  
by his atty,  
Byrnes, Stebbins & Parmelee June 8, 1926.
A. V. A. FITZ
1,588,018
CLAY CUTTING APPARATUS
Filed May 27, 1925    10 Sheets-Sheet 10
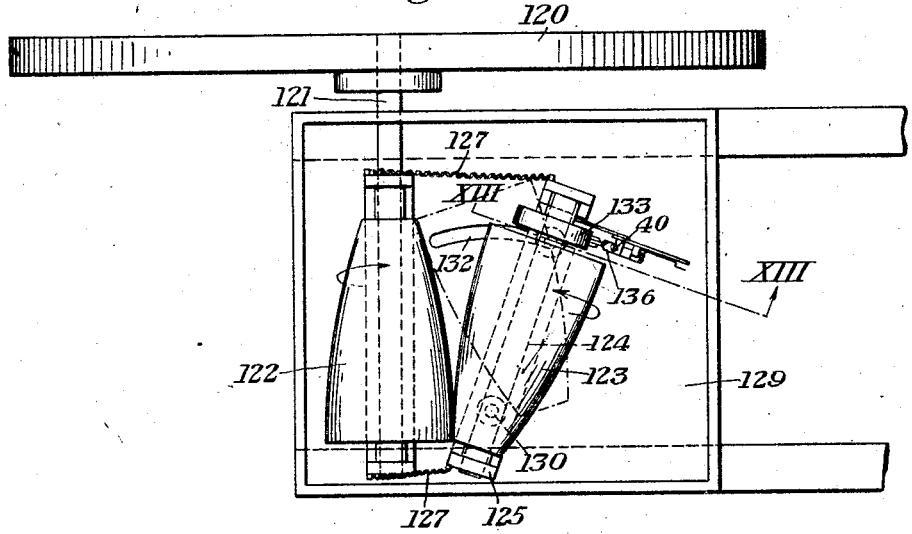
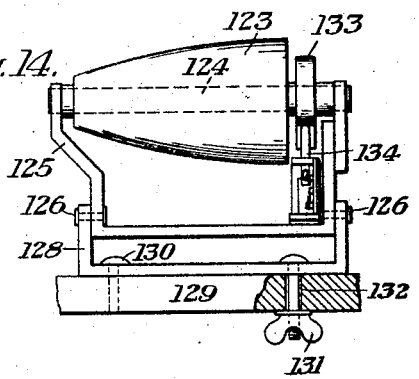
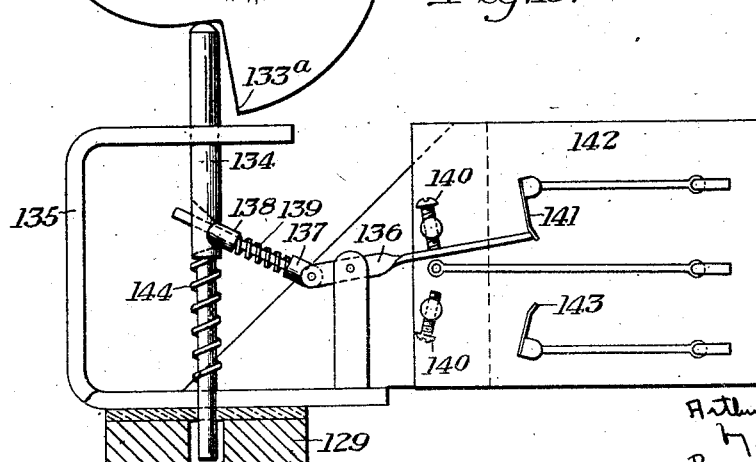
INVENTOR Patented June 8, 1926.

1,588,018

UNITED STATES PATENT OFFICE.

ARTHUR V. A. FITZ, OF SOUTH RIVER, NEW JERSEY, ASSIGNOR TO AMERICAN CLAY PRODUCTS COMPANY, INC., OF SOUTH RIVER, NEW JERSEY, A CORPORATION OF NEW JERSEY.

CLAY-CUTTING APPARATUS.

Application filed May 27, 1925. Serial No. 33,181.

This invention relates to clay cutting apparatus, and particularly to apparatus for cutting a moving clay body, such as a stream of clay issuing from an auger machine or the like, in the manufacture of bricks, hollow tile and similar articles.

The automatic cutting of a clay stream is attended with many difficulties, due principally to the fact that the clay, as it issues from the auger machine, moves at varying speeds, depending upon the properties of the clay itself, the amount of water in the mix, and many other factors. As a result, even though the auger machine is operating at a regular speed, the velocity of the moving stream varies over a wide range. I provide a measuring device contacting with the moving clay and adapted to actuate a cutter at intervals corresponding to desired amounts of movement of the clay body. The action of the cutting means is thus dependent upon the amount of movement of the clay body itself and not upon any predetermined time interval. Preferably, a plurality of spaced cutting means are used so that a number of clay articles can be cut from the moving stream at one operation.

In order to make a square cut, as is generally required, the cutting means are mounted on a moving table over which the clay stream travels. The table is normally held in a position adjacent the auger machine, and the measuring device is connected to apparatus which releases the table at a predetermined point. The friction of the clay with the table causes it to move at the same speed as the clay and the cutting means are actuated during this movement. In consequence, the angle of the cut is determined by the movement of the cutters with respect to the table and entirely independent of the movement of the clay. After the cut is completed the table is returned to its normal position and held there awaiting the next operation.

The cutting means preferably comprises one or more cutting wires, which are so arranged that on the cutting operation they not only move sidewise through the clay, but their inclination also changes materially. This is desirable since the cut is initiated and finished on a corner of the clay body, thus eliminating breaking out of the edges of the green clay stream.

The cutting means are preferably actuated from the same mechanism as that controlling the movement of the table since the cutting action is desired to take place only when the table is in motion. I therefore provide a mechanism adapted to be tripped at intervals by the measuring device and permitting movement of the table in one direction with the clay, and also effecting its automatic return and the movement of the cutting means during the free travel of the table.

In the accompanying drawings:—

Figure 2 is a side elevation of the apparatus shown in Figure 1 with the actuating mechanism removed;

Figure 3 is a view, partly broken away, on the line III—III of Figure 2;

Figure 4 is a perspective view of the cutting means;

Figure 5 is a perspective view of the actuating lever and associated mechanism for operating the cutting means;

Figure 6 is a top plan view of the actuating mechanism;

Figure 7 is a side elevation of the apparatus shown in Figure 6;

Figure 9 is a perspective view of a tripping apparatus used in the actuating device;

Figure 10 is a side elevation of one of the ratchet wheels employed;

Figure 11 is a section on the line XI—XI of Figure 10;

Figure 12 is a top plan view of the measuring device;

Figure 13 is a section on the line XIII—XIII of Figure 12;

Figure 14 is a side elevation of a portion of the apparatus shown in Figure 12, and Figure 15 is a wiring diagram.

Figure 1:
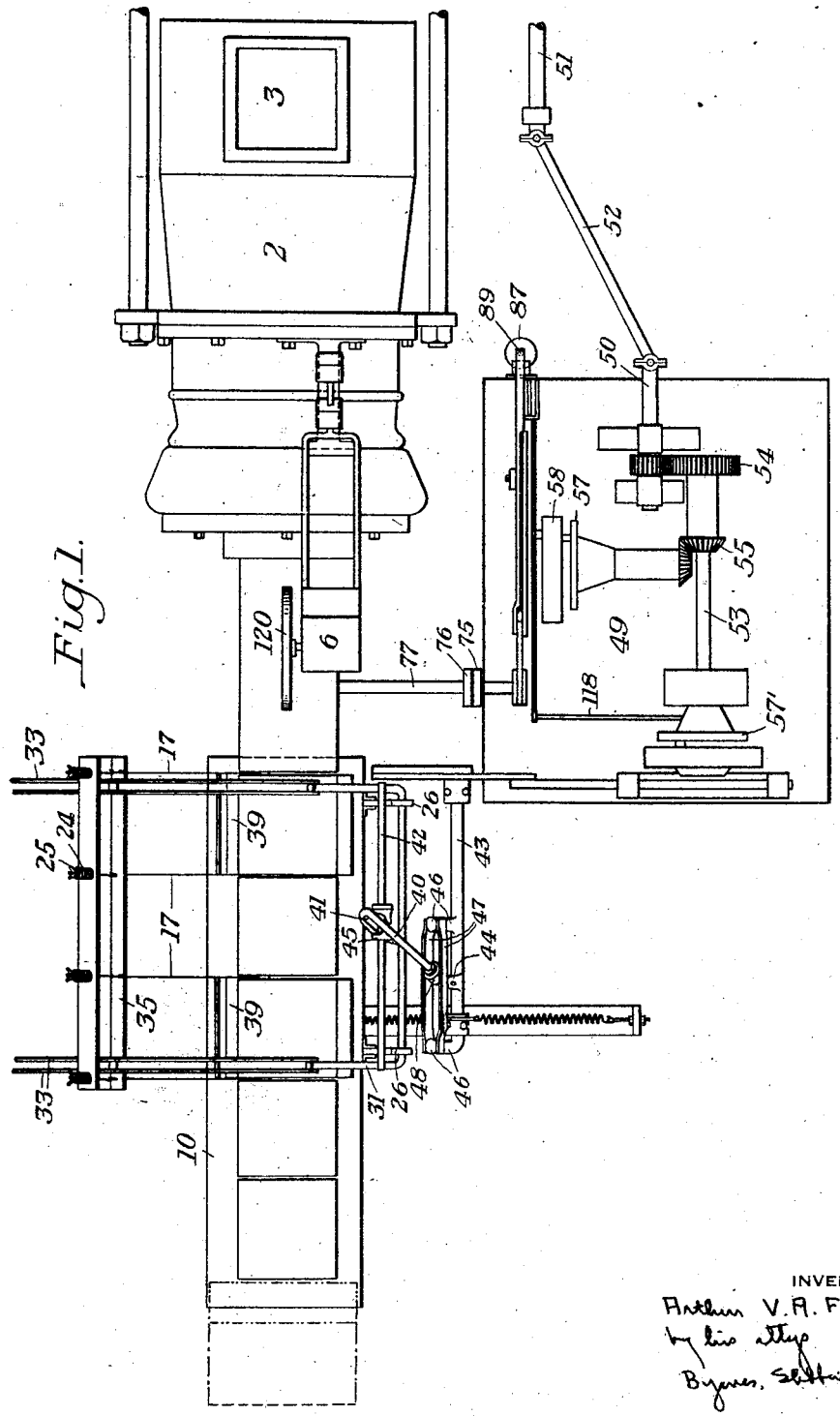
Figure 1 is a top plan view of an auger machine showing the present preferred embodiment of my invention applied thereto.
Figure 8:
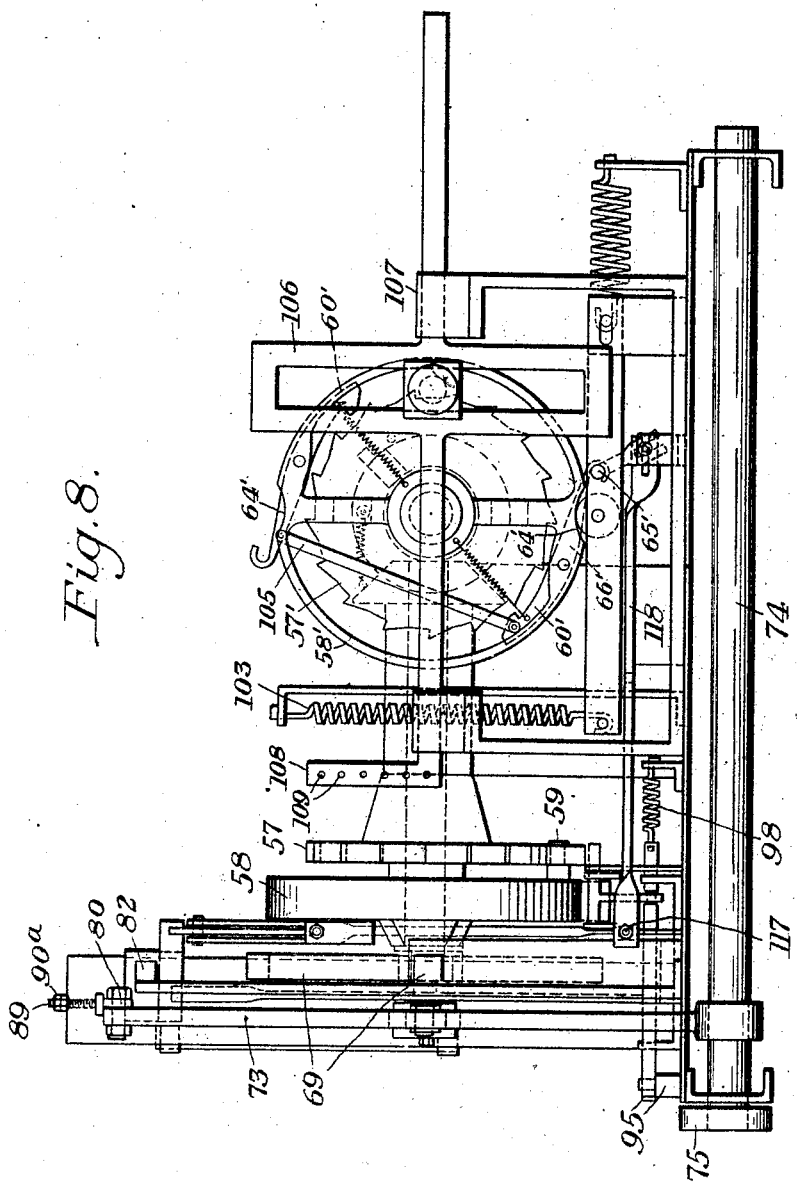
Figure 8 is an end elevation of the apparatus shown in Figure 6.

In the illustrated embodiment of the invention there is shown an auger machine of the customary type indicated generally by the reference character 2. Material is fed through a hopper 3 and issues in a stream through the die 4. The drawings show the auger machine as producing hollow tile but it will be understood that this is merely by way of example.

As the clay stream issues from the die 4 it passes over a stationary table 5. Mounted above the issuing clay stream, so as to bear upon the clay above the table 5, is a measuring device indicated generally by the reference character 6, and which will hereinafter be described in detail. This device is mounted on a lever 7 pivotally connected to the auger machine at 8 and provided with counterweights 9 so as to reduce the load on the body of green clay.

The clay stream passes over the stationary table 5 and onto a moving table, indicated generally by the reference character 10. The table 10 is provided with wheels 11 moving on tracks 12, and is provided with a cutting frame which is effective for cutting the clay into blocks and which will be hereinafter fully described. The table 10 is provided at the end remote from the auger machine with a plate 13 which lies over a belt conveyor 14 regardless of the position on the moving table 10. The table 10 is normally held in the position of Figure 2 until the measuring device 6 releases the same and permits it to move toward the belt conveyor 14. Movement of the table is caused by the friction of the moving clay stream indicated by C, this being materially assisted at the beginning of the stroke by a counterweight 10$^a$. During the movement of the table toward the belt conveyor the stream is cut into blocks B by the cutters and these blocks are pushed across the plate 13 and onto the belt conveyor 14 by the advancing stream of clay. After the table completes its stroke it is returned to the normal position until it is again actuated by the measuring device 6.

The construction of the cutting mechanism is best illustrated in Figures 3 and 4. The table 10 comprises side rails 15 connected by top plates 16 which are slightly spaced apart to allow room for cutting wires 17. The cutting wires 17 are all connected below the table to a bar 18 which is pivotally mounted on brackets 19 at each end of the cutting mechanism. The wires are connected at their upper ends to hooks 20 which are, in turn, connected to a framework made up of two parallel bars 21 secured together by blocks 22. The blocks 22 are pivotally mounted on bearing blocks 23. The hooks 20 are provided with compression springs 24 and thumb nuts 25 so that the wires 17 can be placed under any desired tension.

The brackets 19 are secured to a pair of parallel horizontal frame members 26 which are secured together by tie-rods 27 and diagonal braces 28 so as to provide a substantial and rigid bottom frame. The frame members 26 are movable back and forth with respect to the table 10 being carried by rollers 29 which are, in turn, mounted on brackets 30 secured to the side rails 15 of the carriage 10.

Referring to Figures 3 and 4 it will be seen that the ends of the frame members 26 are turned up and are drilled to form bearings for a pair of generally U-shape members 31 which are held in place by collars 32. The arms of the U-shape members are pivotally connected at their upper ends by bars 33 which carry the bearing blocks 23. As will be seen from Figure 3, the pivot points of the U-shape members 31 in the frame members 26 and the bar 18 on the bracket 19 all lie in a straight line, and similarly, the pivot points of the U-shape members 31 with the bars 33 and also the pivot points of the blocks 22 in the blocks 23 lie in a parallel line. The structure, therefore, is a parallelogram and the U-shape member may be rotated without altering the tension of the cutting wires 17.

A pair of arms 34 extends downwardly from one of the bars 21, and a member 35 is connected to the bottoms of these arms. The bar 34 is provided with oppositely directed slots 36 engaging the several cutting wires 17. This arrangement causes the upper framework carrying the hooks 20 to swing back and forth as the arms of the U-shape members 31 are rotated around their pivot points.

Extending downwardly from one of the U-shape members 31 and rigidly connected thereto is a lever 37 which is connected by a link 38 to the bracket 30$^a$ on the side rail 15 of the movable carriage 10. This causes the cutting mechanism just described to move in a definite course when the U-shape members 31 are rotated in the frame members 26, the movement being a combination of sidewise movement of the entire cutting frame and rotation of the various parts about their pivot points so that, at one end of its stroke, the cutting mechanism lies to one side of the table 15 and inclined as shown in Figure 3, while at the other end of its stroke the cutting mechanism lies on the opposite side with the members inclined in the other direction. This movement throws the cutting wire from one side of the clay stream C to the other side and results in a complete severance of a block from the stream, and it will be seen that with the apparatus initially positioned as shown in Figure 3 the cut will start at the corner $a$ and terminate at the corner $b$. This is highly desirable in cutting green clay, especially if hollow tile or the like is being made, since it minimizes any tendency of the cutting wire to tear out portions of the side wall or to distort the clay stream, as occurs where a straight cut is attempted.

In order to firmly hold the clay stream against sidewise movement during the cutting operation guides 39 of any desired type are provided.

The movement of the cutting frame is accomplished through a lever 40 which is provided with a slotted upper end 41 engaging a cross bar 42 secured to one of the U-shape members 31. The lever 40 is mounted on a shaft 43 which is rocked back and forth by mechanism hereinafter described to effect movement of the cutting frame. Since the cutting frame moves back and forth on a line parallel to the axis of this shaft 43 the lever 40 is pivotally connected, as indicated at 44, and blocks 45 are mounted on the bar 42 to cause movement of the lever with the table 10. A pair of arms 46 project upwardly from the shaft 43 and on these arms are mounted a pair of bearing plates 47 between which is placed a roller bearing 48 mounted on the lever 40. It will be seen that rotation of the shaft 43 in one direction or the other will be communicated to the lever 40 through the plates 47 and will cause movement of the cutting frame in one direction or the other independently of the movement of the carriage along the tracks 12.

The movement of the cutting frame and of the table 10 is accomplished by a mechanism indicated generally by the reference character 49 and shown in detail in Figures 6 to 11, inclusive. This mechanism comprises a drive shaft 50 connected to any convenient source of power, such, for example, as a shaft 51 forming a portion of the auger machine 2, the shaft 51 being connected to the drive shaft 50 through a universal connection 52. The drive shaft 51 is connected to a shaft 53 through reducing gears 54. This shaft also carries one of a pair of mitre gears 55 through which a shaft 56 is driven at the same speed as the shaft 53. No particular speed is necessary since the cutting of the clay depends primarily upon the motion imparted to the cutting table by the clay stream itself and is independent of any time factor. The shaft 53 operates a drive mechanism connected to the shaft 43 for actuating the cutting frame, while the shaft 56 drive a mechanism connected with the table 10 and effective for returning the same to its normal position. The mechanism associated with the shaft 56 will be first described as the mechanism connected with the shaft 53 is dependent upon the movement of the table as will be hereinafter described.

The shaft 56 has keyed thereon a ratchet wheel 57 and has mounted loosely thereon a crank disk 58. The crank disk 58 carries a pin 59 on which is pivoted a pawl 60 which is urged into engagement with the teeth of the ratchet wheel 57 by a spring 61. The crank disk 58 is normally held in the position of Figure 7 by a detent 62 which is carried on a frame 63 and fits into a notch 64 in the rim of the crank disk 58. An axially movable pin 65 is provided in the frame 63 and one end of this pin projects into the plane of the ratchet wheel 57 so as to engage the pawl 60. The pawl 60 is provided with a tail portion 66 which contacts with the pin 65 and holds the pawl out of engagement with the ratchet wheel 57 against the action of the spring 61. If the pin 65 is withdrawn the pawl 60 engages the ratchet wheel 57 and the rotating shaft 56 turns the crank disk 58.

The crank disk 58 is provided with a crank pin 67 on which is mounted a block 68 fitting into a Scotch yoke 69. The yoke 69 moves in bearings 70 and is provided with a crank pin 71. The pin 71 is surrounded by the slotted portion 72ᵃ of a link 72 which is attached to a lever 73 carried on a shaft 74.

The shaft 74 is supplied with a coupling flange 75 for connection with a corresponding flange 76 secured to a shaft 77 (Figure 1). The shaft 77 carries a lever 78 which is connected to the table 10 by a link 79. It will be seen, therefore, that if the lever 73 is free to move to the right, as viewed in Figure 7, the table 10 will be free to move with the stream of clay away from the auger machine, and that if the lever 73 is moved to the left, as viewed in Figure 7, it will cause a return movement of the table 10. The slotted portion 72ᵃ of the link 72 is of such length as to permit movement of the lever 73 to the right from its normal position of Figure 7 when the lever is free to move from its normal position.

The upper end of the lever 73 is connected by a link 80 to a block 81 which is slidable on a guide 82. The block 81 is provided with a portion 83 adapted to be engaged by a catch 84 so as to normally hold the lever 73 in the position of Figure 7 and thus hold the table 10 against movement.

The catch 84 is pivoted at 85 and is connected to a core 86 of a solenoid magnet comprising a winding 87 and a winding 88, which are energized as hereinafter described from the measuring device 6. For the present it will be sufficient to state that the winding 87 is normally energized, thus holding the core 86 to the position shown and insuring that the catch 84 engages the portion 83 and holds the table against movement. The core 86 is connected to the catch 84 by a rod 89 carrying a spring 90. When it is desired to permit movement of the table for cutting the clay the winding 88 is energized and the winding 87 is de-energized, thus causing the core 86 to move downwardly. The nuts 90ᵃ on the rod 89 then strike the catch 84 and lift it out of engagement with the portion 83 of the block 81, freeing the lever 73 and permitting the table 10 to move away from the auger machine, this movement being accomplished by the clay stream.

As the table 10 moves away from the auger machine the block 81 moves to the right, as viewed in Figure 7, and almost at the beginning of its travel engages a pawl 91 which is effective for setting the cutting frame into operation through mechanism to be hereinafter described. For the present it is sufficient to state that the cutting mechanism is operated through this trip during the movement of the table away from the auger machine and independently of the speed of the table so that a suitable cut is secured regardless of the speed of the clay.

To continue with the description of the table operating mechanism, the block 81 at the end of its stroke engages the upper end of a lever 92 which is pivoted at 93 and carries at its lower end a link 94 connected to one arm of a bell crank 95. The other arm of the bell crank is slotted and engages the neck portion of a rod 96 which lies below and substantially parallel with the rod 65. The rod 65 is provided with a depending slotted portion 97 which engages the rod 96. When the block 81 strikes the upper end of the lever 92 the rod 65 is moved endwise a sufficient amount to clear the tail portion 66 of the pawl 60 and permit the pawl to engage the ratchet wheel and cause rotation of the crank disk 58. It will be understood that at this time the lever 73 is to the right, as viewed in Figure 7, and the left hand end of the slotted link 72 is adjacent the crank pin 71. As the crank disk 58 turns the crank pin 71 engages the end of the link 72 and moves the lever 73 back to its position of Figure 7, thus moving the table 10 back to its normal position and permitting the catch 84 to engage the block 81 and hold the table to its normal position. The rotation of the crank disk, however, continues until the crank pin 71 has been returned to its normal position of Figure 7.

Of course, as soon as the return movement of the block 81 commences the lever 92 is freed. A spring 98 (Figure 6) bearing against the end of the rod 96 returns the lever mechanism to its normal position, thus moving the projecting end of the pin 65 back into the plane of the ratchet wheel and causing disengagement of the pawl 60 therefrom.

The detent 62 is provided to stop the motion of the crank disk 58 and to hold the parts in normal position pending another table movement, and provision is made for absorbing the shocks incident to the rapid movement of relatively heavy parts such as are necessarily employed in machines of this character. The frame 63 on which the detent 62 is mounted is provided at one end with a pin 99 which fits in slots 100 in a pair of brackets 101 secured to the base of the machine. A spring 102 normally holds the pin 99 at the right hand end of these slots, as viewed in Figure 7, and a spring 103 at the other end of the lever urges the detent 62 against the crank disk 58. The spring 103 permits pivoting of the frame 63 about the pin 99 as is necessary to free the crank disk during its movement, but it is sufficiently powerful to urge the detent strongly into the groove 64 at the end of the stroke. When the detent is thus engaged the entire frame 63 tends to move toward the left, as viewed in Figure 7, against the force of the spring 102 so that the heavy crank disk 58 is brought to a smooth stop without shock.

There is an occasional tendency for the crank disk to jump over the detent and make an additional stroke, but this is effectually prevented by providing a hook 104 on the end of the tail portion 66 of the pawl 60. Even if the detent should fail to stop the crank disk the positive engagement of the hook 104 with the projecting rod 65 effectually brings the crank disk to a stop and then as the detent settles into the groove 64 the hook 104 is backed away slightly from the pin 65 to permit free withdrawal of the same on the next stroke.

To further reduce the shocks incident to starting and stopping, the ratchet wheel 57 is made in two parts, as shown in Figures 10 and 11. The inner portion $57^a$ is keyed to the shaft and has a smooth flanged perimeter which carries the ratchet ring $57^b$, lugs $57^c$ being provided for holding the parts in proper relation. A pin $57^d$ is provided on the ratchet ring $57^b$ and a corresponding lug $57^e$ is provided on the portion $57^a$ so as to provide a positive drive between the two parts. A spring $57^f$ normally urges the pin $57^d$ ahead of the lug $57^e$ so that when the ratchet wheel is first engaged by the pawl 60 the spring $57^f$ is placed under increased tension and the movement is well under way before a positive drive is secured through the pin $57^d$ coming into contact with the lug $57^e$. When the pawl is released from the ratchet wheel the spring $57^f$ moves the ratchet ring $57^b$ ahead for the next stroke.

Referring now to the mechanism for operating the cutting frame. This mechanism is, in many respects, similar to that just described for the operation of the table 10 and comprises a ratchet wheel 57′ on the shaft 53 and a crank disk 58′ adapted to be driven through the ratchet wheel 57′ by pawls 60′. Two notches 64′ are provided in the crank disk 58′ as it makes only a half revolution at a single stroke. The pawls 60′ are connected together by a link 105 so that when the lower pawl is released by its tail portion 66′ coming in contact with the pin 65′ the upper pawl will also be released.

The crank disk 58′ is provided with a Scotch yoke 106 operating in bearings 107 and provided with a head 108 having a number of holes 109 drilled therein to accommodate a link 110 (Figure 3) by which the mechanism is connected to a lever 111 on the shaft 43.

As above stated, the cutter frame mechanism is actuated only when the table 10 is moving with the clay stream and the movement of the cutting frame is accomplished through the block 81 engaging the trip 91. The trip 91 is pivoted at 112 on a lever 113 which in turn is pivoted at 114. The trip 91 is provided with a depending portion 115 whose weight normally urges the trip to the position of Figure 7, and which also serves for engaging a stop 116. When the movement of the block 81 to the right commences by reason of the release of the catch 84, the lever 113 is rotated around its pivot point 114 and the portion 115 moves to the right until it is engaged by the stop 116. When this occurs the trip 91 is freed from the block 81 and the lever 113 is released. The movement of the lever, however, is communicated through a link 117 to a lever 118 which operates a mechanism similar to that above described in connection with the lever 92, and similar parts have therefore been marked with the same reference characters having a prime attached thereto.

Obviously, the withdrawal of the pin 65' will set the crank disk 58' into operation and cause a movement of the lever 111 to the right or to the left, according to the initial position of the Scotch yoke 106. The stroke of the lever 111 may be varied somewhat by the provision of the holes 109 and similar holes in the lever 111, and it will be seen that the cutting frame is thus moved to one side or the other a desired amount. A complete cycle of operation would be as follows: Assuming that the table 10 is in normal position and the cutting frame is lying toward the right hand side of the table, at a time determined by the measuring device 6 the block 81 is released and the table 10 commences to move away from the auger machine 2. This actuates the trip 91 and the crank disk 58' is effective for swinging the cutting frame to the left hand side of the table, thus cutting the clay into blocks. The table 10 is returned to its normal position with the cutting frame still lying on the left hand side of the table and on the next movement of the apparatus the table is moved from left to right and makes a cut in that direction.

Mechanism similar to that employed in connection with the crank disk 58 is employed in connection with the crank disk 58' to overcome shocks, and further provision is made in springs 119 secured to the arm 46. When the cutting frame nears the end of its stroke one or the other of these springs is placed under considerable tension and is thus effective for slowing down the movement of the cutting frame and bringing it to a stop without shock. This tension spring is further effective for assisting the drive mechanism when the next cut is initiated.

The apparatus above described is effective for releasing the moving table 10 and causing a stroke of the cutting frame whenever the block 81 is released, and is further effective for returning the parts to their normal position pending another release of the block. The measuring device 6 which effects this release is shown in detail in Figures 12 to 15, inclusive. It comprises a measuring wheel 120 mounted on a shaft 121 and rotated by reason of contact with the advancing stream of clay. Obviously, its peripheral speed will be the same as the speed of the clay and, as above described, it is important to time the mechanism in accordance with the amount of movement of the clay stream rather than at any predetermined time intervals.

The shaft 121 has mounted thereon a conoid 122 which is paired with a corresponding conoid 123. The conoid 123 is mounted on a shaft 124 which is mounted in a frame 125. The frame 125 is pivoted for movement about a horizontal axis at 126 and the conoid 123 is urged against the conoid 122 by springs 127. The pivotal mounting of the frame 125 is in a frame 128 which is secured to the base plate 129 by a pivot connection 130 and a wing nut 131 operating in a slot 132 in the base 129. By loosening the wing nut 131 and rotating the frame 128 around its pivot 130 the conoid 123 can be caused to occupy any desired position between the solid line and the chain line positions shown in Figure 12 and thus secure, within limits, any desired speed ratio between the shaft 121 and the shaft 124. The shaft 124 carries a switch operating cam 133 as best shown in Figure 13. This cam operates a plunger 134 which is mounted in a bracket 135 secured to but insulated from the base 129. Pivoted in the bracket 135 is a switch arm 136 provided with a pivoted link 137 on which is slidably mounted a bearing block 138. A spring 139 constantly urges the bearing block 138 away from the pivotal connection between the switch arm 136 and link 137. With the parts in the position shown in Figure 13 the switch arm 136 is being urged upwardly by the spring 139, its upward movement being limited by one of a pair of stop screws 140. In this position the switch arm contacts with a terminal 141, which terminal is mounted on a block 142 of insulating material. It will be clear that when the plunger 134 is depressed by the cam 133 the link 137 will rotate about its pivot point and compress the spring 139 until the link 137 is rotated beyond the line of the switch 136. At that time the expansion of the spring 139 will impart a snap action to the switch arm 136, throwing it downwardly and into contact with a terminal 143 which is also mounted on the block 142. The switch arm is held in the lower position until the cam 133 is rotated to a point where the cam portion 133ª passes over the plunger. At that time a spring 144, which is relatively stronger than the spring 139, throws the plunger up to the position of Figure 13 and the switch is again reversed.

The wiring of the apparatus is shown in Figure 15. Power is supplied from any source, indicated diagrammatically in Figure 15 by the reference character 145, and a wire 146 leads from this source to the terminal 143. A branch wire 147 leads to one end of the winding 88 and the other end of the winding 88 is connected to one end of the winding 87 as indicated at 148. The other end of the winding 87 is connected back to the power source by a wire 149 so that a constant circuit for both windings is provided. A branch wire 150 leads from the wire 149 to the switch terminal 141 and a wire 151 leads from the point 148 at the junction of the two coil windings to the switch terminal 152 which is grounded on the bracket 135. With the switch arm in the lower position, as shown in Figure 15, it will be seen that the path provided by the wire 146, the switch terminal 143, the terminal 152 and the wire 151 offers less resistance than the path through the winding 88. In other words, the winding 88 will be short circuited with the switch arm in the lower position and the winding 87 alone will be effective for attracting the core 86. If the switch arm is reversed the winding 87 will be short circuited and the winding 88 will pull the core 86 downwardly and permit movement of the moving table 10. I have found that it is far more desirable to short circuit a coil by the arrangement shown in Figure 15 than it is to switch current off and on at intervals. The arrangement shown eliminates arcing of the switch points and is highly satisfactory especially for rapid operation.

Obviously, the core 86 can be actuated at any desired interval and this interval may be readily changed by varying the relative position of the conoids 122 and 123. It is therefore possible to determine the length of the block cut from the leading end of the clay stream by properly positioning the conoid 123 while, of course, the length of the remaining blocks which are cut at any operation of the cutting frame is determined by the spacing of the wires 17. Referring to Figure 4 it will be seen that the cutting frame has been placed in operation at a time when the advancing end of the clay stream has progressed a few inches beyond the first cutting wire 17. This is desirable in many operations where the green blocks are piled on top of one another for drying. On the trucks ordinarily used for the steam drying step the blocks are piled three deep and their weight is such that when the blocks contract, due to the steam heating, the clay which is in contact with the truck is generally broken up. The small section cut off from the head of the advancing stream at every stroke of the cutting table with a setting of the measuring device corresponding to a cut such as shown in Figure 4 provides what is known as a "ring" on which the full sized blocks may be placed for the drying operation. During the steaming process this ring is broken up into small pieces but it preserves the blocks against injury.

If desired, of course, the conoid 123 may be so placed that the clay will advance beyond the leading wire 17 the length of a complete block before the cutting frame is set in motion. Under such conditions the apparatus shown is effective for cutting four complete blocks and, of course, the arrangement of the cutting wires may be changed as desired.

The word "clay" as used herein is used as a word of general definition and not of limitation, and is intended to include all plastic materials of the same general nature, to which the machine may be readily applied, as will be apparent.

While I have shown a preferred form of the invention it will be understood that it is not limited to this form since it may be otherwise embodied within the scope of the following claims.

I claim:

1. Apparatus for cutting a moving clay body, including a carriage movable from a normal position with the clay to be cut, means for holding the carriage in such normal position, means operated in accordance with the movement of the clay for releasing the carriage to permit travel with the clay, a cutter mounted on the carriage, means for automatically operating the cutter during the movement of the carriage, and means for automatically returning the carriage to its normal position after the cutter has operated.

2. Apparatus for cutting a moving clay body, including a carriage movable from a normal position with the clay to be cut, a cutter mounted on the carriage, means for holding the carriage in its normal position, means for measuring the advance of the clay body, and means actuated in accordance therewith for operating the cutting means and for releasing the carriage from its normal position.

3. Apparatus for cutting a moving clay body, including cutting means, a measuring device contacting with the moving clay, means controlled by the measuring device for actuating the cutting means at intervals corresponding to substantially equal amounts of movement of the clay body, and means for varying the amount of movement required to actuate the cutting means.

4. Apparatus for cutting a moving clay body, including a carriage movable with the clay, cutting means movable with the carriage, stationary means for operating the cutting means as the carriage is moving with the clay, and a positive driving connection from the stationary operating means, said driving connection having a portion movable with the carriage.

5. Apparatus for cutting a moving clay body, including a carriage movable with the clay, reciprocating cutting means movable with the carriage, means for automatically operating the cutting means as the carriage is moving, and means for absorbing the shock incident to the stopping of the cutting means.

6. Apparatus for cutting a moving clay body, including a carriage movable with the clay, an actuating frame mounted for sidewise movement on the carriage, a cutter mounted on the frame, means for moving the cutter bodily crosswise with the cutting frame, and means for changing the inclination of the cutter during such crosswise movement.

7. Apparatus for cutting a moving clay body, including a carriage movable with the clay, a cutting frame base mounted for crosswise movement on the carriage, vertically extending members pivoted on the base, pivoted links connecting the vertically extending members whereby a pivoted cutting frame is provided, a cutter pivotally mounted on the frame, and means for moving the entire frame crosswise and rotating the several parts of the frame and the cutter about their pivot points.

8. Apparatus for cutting a moving clay body, including a carriage movable with the clay, a cutting frame base mounted for crosswise movement on the carriage, vertically extending members pivoted on the base, pivoted links connecting the vertically extending members whereby a pivoted cutting frame is provided, a cutter pivotally mounted on the frame, a link connecting a vertically extending member of the frame to the carriage whereby a definite travel of the frame occurs upon the same being urged crosswise, and means for urging the frame crosswise during a movement of the carriage.

9. Apparatus for cutting a moving clay body, including a carriage movable with the clay, a cutting frame base mounted for crosswise movement on the carriage, vertically extending members pivoted on the base, pivoted links connecting the vertically extending members whereby a pivoted cutting frame is provided, a cutter pivotally mounted on the frame, a link connecting a vertically extending member of the frame to the carriage whereby a definite travel of the frame occurs upon the same being urged crosswise, a lever connected to the frame, the lever being adapted for substantially free movement in the direction of travel of the carriage, and means for moving the lever crosswise.

10. Apparatus for cutting a moving clay body, including a carriage movable from a normal position with the clay to be cut, a cutter movable with the carriage, means for automatically operating the cutter as the carriage is moving with the clay, means for releasing the carriage from its normal position and permitting it to be moved by the clay, and a counterweight for assisting the clay in moving the table.

11. Apparatus for cutting a moving clay body, including a carriage movable from a normal position with the clay to be cut, a cutter movable with the carriage, means for automatically operating the cutter as the carriage is moving with the clay, means for releasing the carriage from its normal position and permitting it to be moved by the clay, and means for assisting the clay in overcoming the inertia of the table.

12. Apparatus for cutting a moving clay body, including a carriage movable with the clay, a cutter mounted on the carriage and adapted for crosswise movement, means for moving the cutter, and means actuated by the movement of the carriage for setting the cutter operating means in operation.

13. Apparatus for cutting a moving clay body, including a carriage movable with the clay, a cutter mounted on the carriage and adapted for crosswise movement, means for holding the carriage against movement by the clay, means for releasing the carriage to permit such movement, and means actuated subsequent to such release for setting the cutter operating means in operation.

14. Apparatus for cutting a moving clay body, including a carriage movable from a normal position with the clay, a cutter mounted on the carriage and adapted for crosswise movement, holding means for maintaining the table in its normal position, a measuring device adapted to release the table and to permit movement thereof on a predetermined travel of the clay, and means actuated by the movement of the carriage for operating the cutter.

15. Apparatus for cutting a moving clay body, including a carriage movable from a normal position with the clay, a cutter mounted on the carriage and adapted for crosswise movement, a wheel contacting with the clay and rotated thereby, a switch operated by the wheel, and electro-magnetic means controlled by the switch for permitting movement of the table from its normal position.

16. Apparatus for cutting a moving clay body, including a carriage movable from a normal position with the clay, a cutter mounted on the carriage and adapted for crosswise movement, a wheel contacting with the clay and rotated thereby, a switch operated by the wheel, electro-magnetic means controlled by the switch for permitting movement of the table from its normal position, and a variable speed connection between the wheel and the switch.

17. Apparatus for cutting a moving clay body, including a cutter adapted to sever the moving clay, a wheel contacting with the clay and rotated thereby, a switch operated by the wheel, and electro-magnetic means controlled by the switch for setting the cutter into operation.

18. Apparatus for cutting a moving clay body, including a cutter adapted to sever the moving clay, a wheel contacting with the clay and rotated thereby, a switch operated by the wheel, electro-magnetic means controlled by the switch for setting the cutter into operation, and a variable speed connection between the wheel and the switch.

19. Apparatus for cutting a moving clay body, including a cutter adapted to sever the moving clay, a wheel contacting with the clay and rotated thereby, a switch operated by the wheel, electro-magnetic means controlled by the switch for setting the cutter into operation, and a variable speed connection between the wheel and the switch, said connection including a conoid adapted to make surface contact at different points with a rotating portion and to communicate rotary motion.

20. Apparatus for cutting a moving clay body, including a reciprocable cutter, a reciprocable carriage movable with the clay, the cutter being adapted for crosswise movement of the carriage, a power source, a measuring device, holding means for the carriage, means actuated by the measuring device, for releasing the holding means means actuated by the movement of the carriage for connecting the power source to the cutter, means for disconnecting the cutter from the power source at the end of the cutter stroke, table return means, and means for connecting the power source to the table return means at the end of the table stroke.

21. Apparatus for cutting a moving clay body, including a reciprocating carriage, a cutter on the carriage, a power source, a measuring device, a movable block connected to and movable with the carriage, a catch for holding the block and preventing movement of the table, means actuated by the measuring device for releasing the catch, a device adapted to be actuated by the block and effective for connecting the power source to the cutter, means for disconnecting the cutter from the power source at the end of the cutter stroke, table return means, and means adapted to be actuated by the block and effective for connecting the power source to the table return means at the end of the table stroke.

22. Apparatus for cutting a moving clay body, including a reciprocable table movable with the clay, a cutter mounted on the table and adapted for movement crosswise of the table, a power source, a pawl and ratchet connection between the table and the power source, a pawl and ratchet connection between the power source and the cutter, means for normally holding said pawls out of engagement with their respective ratchets, means actuated in accordance with the movement of the clay for releasing the table to permit movement thereof, means for thereafter establishing the pawl and ratchet connection between the power source and the cutter, means for breaking such connection at the end of a cutter stroke, and means for establishing the pawl and ratchet connection between the table and the power source at the end of the table stroke to effect a return stroke of the table.

23. Apparatus for cutting a moving clay body, including a reciprocable table movable from a normal position with the clay, a cutter mounted on the table and adapted for movement crosswise thereof, a power source, a measuring device operated in accordance with the movement of the clay, means connected with the measuring device for releasing the table from its normal position to permit movement thereof, means for thereafter establishing a connection between the power source and the cutter to cause a movement of the cutter during the travel of the table with the clay, means for breaking such power connection after the cutter has operated, means for establishing a power connection between the power source and the table at the end of a table stroke for causing return of the table to its normal position, and means for disconnecting the power source from the table after the return stroke has been effected.

24. Apparatus for cutting a moving clay body, including a carriage movable with the clay to be cut, a cutter mounted on the carriage, a measuring device adapted to set the cutting means in operation upon a predetermined amount of movement of the clay body, and means for adjusting the amount of movement of the clay body required to set the cutting means in operation.

25. Apparatus for cutting a moving clay body, including a carriage movable from a normal position with clay to be cut, means normally holding the carriage in such position, a cutter mounted on the carriage, a measuring device adapted to release the holding means upon a predetermined amount of movement of the clay body, and means for adjusting the amount of movement of the clay body required to release the holding means.

26. Apparatus for cutting a moving clay body, including a carriage movable from a normal position with the clay to be cut, means normally holding the carriage in such position, a cutter mounted on the carriage, a measuring device adapted to release the holding means upon a predetermined amount of movement of the clay body, means for adjusting the amount of movement of the clay body required to release the holding means, and means for automatically returning the carriage to its normal position after the cutter has operated to await a further release of the holding means.

27. Apparatus for cutting a moving clay body, including cutting means, a measuring device contacting with the moving clay and adapted to set the cutting means in operation upon a predetermined amount of movement of the clay, and means for adjusting the amount of movement required to set the cutting means into operation.

28. Apparatus for cutting a moving clay body, including a reciprocable cutter, cutter actuating means, a power source, a measuring device having connections for operatively coupling the cutter actuating means and the power source, means for disconnecting the cutter actuating means from the power source at the end of a stroke, and means for varying the amount of movement of the clay required to cause the measuring device to function.

In testimony whereof I have hereunto set my hand.

ARTHUR V. A. FITZ.